April 7, 1964
V. L. SMITHERS
3,127,698
HOLDER FOR FLOWER ARRANGEMENTS
Filed Dec. 8, 1961
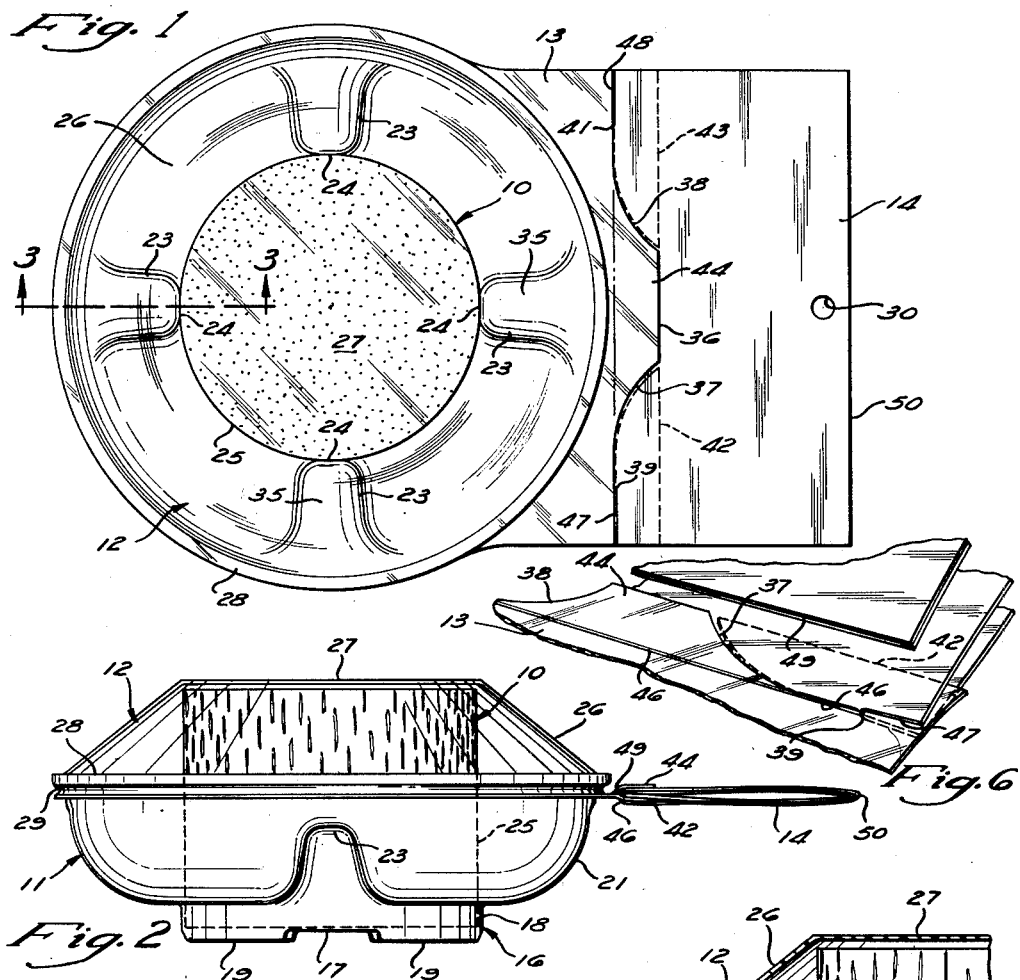
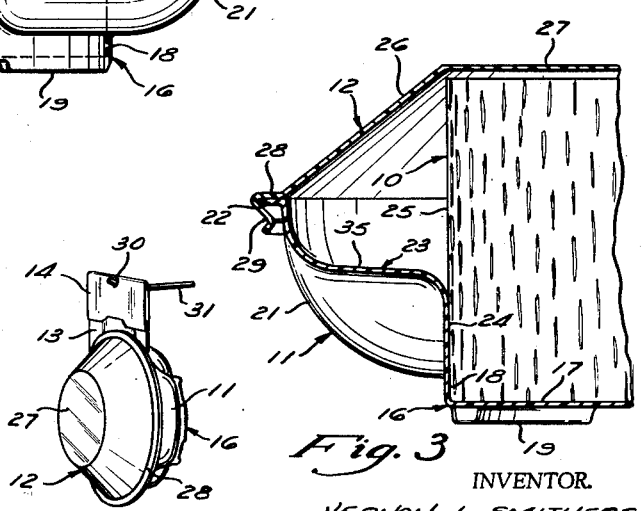
INVENTOR.
VERNON L. SMITHERS
BY
RICHEY, McNENNY & FARRINGTON
ATTORNEYS United States Patent Office 3,127,698
Patented Apr. 7, 1964

3,127,698
HOLDER FOR FLOWER ARRANGEMENTS
Vernon L. Smithers, Kent, Ohio, assignor to The V. L. Smithers Manufacturing Company, Kent, Ohio, a corporation of Ohio
Filed Dec. 8, 1961, Ser. No. 157,896
3 Claims. (Cl. 47—41)

This invention relates generally to holders for flower arrangements and more particularly to a holder for cut flower arrangements which is sturdy, attractive, and suitable for shipping, storage, and display for sale and which is low in cost so that it may be discarded after single use.

A holder for flower arrangements incorporating this invention includes a decorative dish-like element, a block of water absorbent material into which the stems of cut flowers are inserted, and a removable protective cover to protect the water absorbent material during storage, shipment, and display of the device. The water absorbent material is preferably a block of foam made and treated as described in my U.S. Patent Number 2,753,277 issued July 3, 1957 although this invention is not limited to this particular material.

An important object of this invention is to provide a novel and improved low cost holder for flower arrangements which may be discarded after a single use.

Another important object of this invention is to provide a novel and improved sturdy low cost holder for flower arrangements which is not damaged by normal shipping and storage practices.

Still another object of this invention is to provide a novel and improved holder for flower arrangements in combination with a removable protective cover which cooperates with the holder to provide a sturdy package suitable for shipment, storage and display.

Still another important object of this invention is to provide a holder for flower arrangements having a block of water absorbent material in combination with a dish-like element having substantially uniform wall thickness shaped to firmly secure the block of material in position.

Still another important object of this invention is to provide a novel and improved holder for flower arrangements having a protective cover used to protect water absorbent material therein during the marketing and sale of the device, and which is also ornamental to provide an attractive item of commerce.

Further objects and advantages will appear from the following description and drawings wherein:

FIGURE 1 is a plan view of a holder for flower arrangements incorporating this invention with the protective cover in place;

FIGURE 2 is a side elevation with the protective cover in place;

FIGURE 3 is a fragmentary section taken along 3—3 of FIGURE 1;

FIGURE 4 is a perspective view of the holder in use with a flower arrangement;

FIGURE 5 is a perspective view illustrating how the device may be supported for display in stores; and FIGURE 6 is an enlarged fragmentary perspective view of the structure for connecting the instruction sheet to the cover.

Referring to the drawings, a holder for flower arrangements includes a cylindrical piece of porous water absorbent material 10 which is preferably manufactured and treated in the manner described in my prior patent cited above, a dish 11 formed of thin molded sheet material supporting the porous material 10 in position, and holding water when it is used with a flower arrangement. A protective cover 12 detachably connected to the dish 11 to protect the porous material 10 is provided with a tab 13 on which is secured an instruction sheet 14. The sheet 14 is printed with instructions as to the preferred method of use of this device and also provides a means for hanging the device for display in stores and the like.

The dish 11 may be formed of high impact polystyrene plastic colored to provide a pleasing appearance when the device is used with a flower arrangement. If desired, other materials such as polyvinyl chloride acetate or cellulose acetate butyrate may be used. The dish 11 is shaped to provide a maximum degree of strength with a minimum wall thickness and to permit manufacture by vacuum or pressure molding. The dish includes a cylindrical base 16 having a bottom wall 17 and cylindrical side wall 18. The base is formed with shallow legs 19 extending below the bottom wall 17 to support the dish in use. At the upper end of the side wall 18 is a flaring curved wall 21 which extends to a radially extending rim 22 at the open end of the dish. The flaring side wall 21 is formed with a compound curve which is substantially semispherical to provide stiffness and an attractive appearance.

A plurality of the re-entrant projections 23 spaced around the periphery of the flaring side wall 21 each extend into a terminal wall 24 which is aligned with the side wall 18 of the cylindrical base. These re-entrant projections serve the dual functions of adding strength to the dish 11 and in addition providing the terminal walls 24 which engage the side wall 25 of the cylindrical block of water absorbent material at spaced points around its periphery to securely position the block 10. Preferably, the cylindrical base 16 and the terminal walls 24 are proportioned so that the block is slightly compressed and thereby gripped by the dish 11 when the block is inserted into position. The block is mounted in position by merely pressing it down between the terminal walls 24 and into the cylindrical base 16.

The protective cover 12 is formed with a conical wall 26 terminating at a flat wall 27 adjacent to the upper end of the block 10. The end wall 27 is circular in section and of substantially the same diameter as the cylindrical block 10. The lower end of the conical wall 26 is formed with a radial section 28 and a reverse conical section 29 which cooperates with the radial section 28 to embrace the rim 22 when the protective cover is in place. The protective cover 12 is snapped on the rim of the dish removably securing the cover to the dish 11 and providing a connection which supports the open ends of both the dish 11 and protective cover 12. By supporting one end of the conical wall 26 with the end wall 28 and the other end with the dish, a high degree of strength is provided since any substantial distortion of the conical wall would require stretching of the wall material and not mere flexing. Therefore, the dish 11 and cover 12 each cooperate to produce a sturdy package and cooperate to prevent damage to the block 10 when the device is shipped, stored or displayed.

The block of water absorbent material 10 formed as described in my patent cited above has a grain structure which promotes the flow of water in the direction of the grain. The block should therefore be cut with the grain substantially parallel to the axis of the block. The block 10, however, is weak and easily crushed, particularly normal to the direction of the grain. Therefore, the spacing of the flaring wall 21 and the conical wall 26 from the side 25 of the block 10 prevents contact with such sides and protects the block 10 against damage.

The protective cover is preferably formed of a clear sheet of cellulose acetate butyrate so the customer can see the water absorbent material 10 even when the cover is in place.

Referring now to FIGURES 1 and 6, the instruction sheet 14 is secured to the tab 13 by a novel connection which permits easy removal by the user and yet provides a secure mounting prior to such removal. The tab 13 is formed with two cuts 37 and 38 extending from the edge 36 along curved lines and terminating at 39 and 41 respectively. These cuts provide inwardly extending projections 42 and 43 and a central lip 44. The instruction sheet 14 is folded in half along a fold 46 and then folded again along a fold 50. This second fold 50 brings the end edges 49 to a position adjacent the fold 46. The sheet is notched at 47 and 48 along the fold 46. The inner ends of the notches 47 and 48 are spaced apart a distance substantially equal to the spacing between the points 39 and 41 of the cuts 37 and 38.

Mounting of the instruction sheet on the tab 13 is accomplished by inserting the projections 42 and 43 in along the fold 46 as illustrated in FIGURES 1 and 6 and then inserting the edges 49 under the lip 44. FIGURE 6 illustrates the sheet 14 after the projections are inserted along the fold 46 and before the edges 49 are inserted under the lip 44. The lip therefore serves to hold the edges 49 down, as illustrated in FIGURE 2, and the projections 42 and 43 provide the connection between the sheet 14 and lip 13.

The instruction sheet 14 is formed with a punched hole 30 so that the device can be hung on a display rack 31 as illustrated in FIGURE 5. The instruction sheet is printed on a relatively stiff paper to provide sufficient strength.

When the device is to be used, the instruction sheet is removed from the tab 13. The protective cover 12 is then removed by pulling the tab 13 and pressing in on the wall of the dish. The dish is then placed in a horizontal position and filled with water which is absorbed by the material 10. The upper walls 35 of the re-entrant projections 23 are spaced below the rim 22 so that water flows all around the block 10 when the dish is filled. As soon as the porous plastic is saturated with water, the stems can be inserted in any position desired to make the appropriate flower arrangement.

Because the dish and cover are shaped to provide maximum degrees of strength with substantially uniform thin walls, the cost of the material is low. The manufacturing cost with vacuum or pressure moldings is also low so the unit may be discarded after a single use.

Although a preferred embodiment of this invention is illustrated, it is to be understood that various modifications and rearrangements of parts may be resorted to without departing from the scope of the invention as defined in the following claims.

What is claimed is:

1. A holder for flower arrangements comprising a dish member having a base, outwardly flaring outside walls extending upwardly from said base, a plurality of inwardly extending re-entrant projections in said flaring walls terminating at parallel spaced inner extremities, and a block of water absorbent material engaging and laterally supported by said inner extremities throughout the length thereof, said flaring walls extending above said projections whereby liquid in said dish flows over said projections into the spaces therebetween, said dish having a substantially uniform wall thickness.

2. A holder for flower arrangements comprising a dish formed with a cylindrical base, upwardly and outwardly diverging walls extending from the periphery of said cylindrical base, and a plurality of re-entrant projections in said diverging walls spaced around said dish, extending inwardly from said diverging walls and each terminating at inner extremities forming a continuation of said cylindrical base, said dish having a substantially uniform wall thckness, and a cylindrical block of water absorbent material positioned with one end in said cylindrical base and with its side wall engaging and supported by said cylindrical side wall and said inner extremities of said projections.

3. A holder for flower arrangements comprising a dish member having a base, outwardly flaring outside walls extending upwardly from said base, a plurality of inwardly extending re-entrant projections in said flaring walls terminating at parallel spaced inner extremities, a block of water absorbent material engaging and laterally supported by said inner extremities throughout the length thereof, said flaring walls extending above said projections whereby liquid in said dish flows over said projections into the spaces therebetween, said dish having substantially uniform wall thickness, a radially extending rim at the upper edge of said walls, and a cover closing said dish formed with opposed radially extending walls embracing said rim and detachably connecting said cover thereto, said cover being formed of a substantially nonelastic deflectable material having an upstanding conical wall supported at its open end by the connection between said dish and cover and extending to a circular end wall positioned over and spaced from the end of said water absorbent material.

References Cited in the file of this patent

UNITED STATES PATENTS

| | | |
|---|---|---|
| 2,044,192 | Templin | July 16, 1936 |
| 2,614,727 | Robinson | Oct. 21, 1952 |
| 2,774,187 | Smithers | Dec. 18, 1956 |
| 2,994,985 | Jackson | Aug. 8, 1961 |